United States Patent
Gläser et al.

(10) Patent No.: US 7,926,346 B2
(45) Date of Patent: Apr. 19, 2011

(54) MEASURING DEVICE FOR CHANGING AN ANGULAR POSITION OF A TRANSMITTER IN RELATION TO A BASIC BODY

(75) Inventors: Thomas Gläser, Röttenbach (DE); Ulrich Wetzel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 852 days.

(21) Appl. No.: 11/910,118

(22) PCT Filed: Mar. 27, 2006

(86) PCT No.: PCT/EP2006/061047
§ 371 (c)(1),
(2), (4) Date: Sep. 28, 2007

(87) PCT Pub. No.: WO2006/103207
PCT Pub. Date: Oct. 5, 2006

(65) Prior Publication Data
US 2008/0271531 A1    Nov. 6, 2008

(30) Foreign Application Priority Data
Mar. 31, 2005   (DE) .................. 10 2005 014 808

(51) Int. Cl.
*G01P 1/02*   (2006.01)
(52) U.S. Cl. .......................................... 73/488
(58) Field of Classification Search ........... 73/488, 73/493, 431, 494, 490
See application file for complete search history.

(56) References Cited

U.S. PATENT DOCUMENTS

| | | | |
|---|---|---|---|
| 4,174,484 A | 11/1979 | Schmider | |
| 4,656,990 A * | 4/1987 | Miyaki et al. | 123/494 |
| 4,759,218 A | 7/1988 | Rodi et al. | |
| 5,138,997 A * | 8/1992 | Fehlmann | 123/449 |
| 5,744,706 A * | 4/1998 | Siraky | 73/112.01 |
| 5,763,970 A | 6/1998 | Dunning et al. | |
| 2003/0094568 A1 | 5/2003 | Meschko | |

FOREIGN PATENT DOCUMENTS

| | | |
|---|---|---|
| DE | 24 10 692 | 9/1975 |
| DE | 195 20 388 A1 | 12/1996 |
| EP | 0 236 335 B1 | 12/1989 |
| JP | 11 287610 | 3/1998 |

* cited by examiner

*Primary Examiner* — Helen C. Kwok
(74) *Attorney, Agent, or Firm* — Henry M. Feiereisen; Ursula B. Day (57) ABSTRACT

The invention relates to a measuring device comprising a transmitter (1) for measuring a position and/or a rotational speed of a rotary element (2), a housing (3), and a plate (4) comprising a recess for receiving a transmitter (1), the transmitter (1) being rotatably arranged in relation to the plate (4). The transmitter (1), the plate (4) and the housing (3) are arranged in such a way that when the housing (3) is connected to the base body (5), the housing (3) presses the plate (4) against the base body (5). In this way, the transmitter (1) is pressed against the base body and the housing is pressed against the plate. The invention also relates to a method for fixing a housing of the above-mentioned measuring device. The angular position of the housing can be modified independently of the angular position of the transmitter in relation to a base body.

18 Claims, 6 Drawing Sheets

MEASURING DEVICE FOR CHANGING AN ANGULAR POSITION OF A TRANSMITTER IN RELATION TO A BASIC BODY

BACKGROUND OF THE INVENTION

The invention relates to a measuring device having a transmitter for measuring a position and/or a rotation speed of a rotatable element.

The invention furthermore relates to a method for fixing a housing of the abovementioned measuring device.

In addition, the invention relates to a machine tool, production machine and/or robot having the abovementioned measuring device.

In addition, the invention relates to a motor or generator having the abovementioned measuring device.

A measuring device for measuring, for example, a position and/or a rotation speed of a shaft of a motor nowadays generally has a transmitter and a housing, which may be present, for example, in the form of a motor cover. In such a customary measuring device, the motor cover is connected permanently and firmly to the transmitter, and the transmitter shaft is connected to the motor shaft by means of a coupling. Since the angular position of the rotary transmitter needs to be aligned in relation to the motor winding and in particular needs to be known (requirement for correct control of the motor), the angular position of the transmitter in relation to, for example, an end frame of the motor is predetermined by a mechanical coding. Since the transmitter in such customary measuring devices is firmly connected to the housing, when installing the measuring device the angular position of the housing and therefore the angular position of the interface connection of the housing is therefore also fixed. However, it is now often desirable for the angular position of the interface connection to be capable of being changed easily and in particular for it to no longer be correlated with the angular position of the transmitter, with the result that, for example, the angular position of the interface connection can be aligned in the direction of, for example, a control assembly in order to optimize the routing of cables between the measuring device and the control assembly and in particular in order to avoid kinks in the cable routing.

SUMMARY OF THE INVENTION

The object of the present invention is to provide a simple measuring device and a simple method for fixing a housing of the measuring device, with which measuring device the angular position of the housing can be changed independently of the angular position of the transmitter in relation to a basic body.

This object is achieved by a measuring device comprising
a transmitter for measuring a position and/or a rotation speed of a rotatable element,
a housing,
a plate with a cutout for accommodating a transmitter, the transmitter being arranged such that it can rotate with respect to the plate,
the transmitter, the plate and the housing being arranged in such a way that, when the housing is connected to a basic body, the housing presses the plate in the direction of the basic body and in this way the transmitter is pressed against the basic body and the housing is pressed against the plate.

Furthermore, this object is achieved by a method for fixing a housing of the measuring device according to the invention, the housing being fixed by, when the housing is connected to the basic body, the plate being pressed by the housing in the direction of the basic body and in this way the transmitter being pressed against the basic body and the housing being pressed against the plate.

It has proven to be advantageous that the plate is connected to the housing via a spring element and/or a spacer. This ensures a safe variable connection between the plate and the housing.

Furthermore, it has proven to be advantageous if the plate is connected to the transmitter via a spring element in such a way that it can rotate. This is a simple way of making possible a safe rotatable connection between the plate and the transmitter.

Furthermore, it has proven to be advantageous that the spring element is in the form of a helical spring, an O ring and/or a rubber sleeve. Designs of the spring element in the form of a helical spring, an O ring and/or a rubber sleeve represent conventional designs of a spring element.

Furthermore, it has proven to be advantageous that the spacer is in the form of a screw and/or a press pin. A screw and/or a press pin represents a conventional spacer.

In addition, it has proven to be advantageous that the element is in the form of a shaft and/or in the form of a spindle. Design of the element in the form of a shaft and/or in the form of a spindle, for example of a machine tool, production machine and/or a robot, represent conventional designs of the element.

Furthermore, it has proven to be advantageous that the shaft is in the form of a motor shaft or a generator shaft. Designs of the shaft in the form of a motor shaft or a generator shaft represent conventional designs of the shaft.

Furthermore, it has proven to be advantageous that the basic body is in the form of an end frame. A design of the basic body in the form of an end frame, for example of a motor or a generator, represents a conventional design of the basic body.

Furthermore, it has proven to be advantageous that the transmitter has an annular groove in which the plate engages. This measure makes possible a safe rotary movement of the transmitter in the cutout of the plate. Furthermore, it has proven to be advantageous that the transmitter and the basic body have an interlocking mechanical coding, which defines the angular position of the transmitter in relation to the basic body and/or arranges the transmitter centrally on the basic body. As a result, the angular position of the transmitter in relation to the basic body is defined in a simple manner, the transmitter possibly being arranged centrally on the basic body.

In addition, it has proven to be advantageous that the coding is in the form of a pin with a depression corresponding to the pin. The design of the coding in the form of a pin with a depression corresponding to the pin represents a particularly simple mechanical coding.

Furthermore, it has proven to be advantageous that the coding is in the form of a flattened portion on a centering ring with a recess on the basic body which corresponds to the flattened portion. The design of a coding in the form of a flattened portion on a centering ring with a recess which corresponds to the flattened portion likewise represents a simple option for the mechanical coding.

In addition, it has proven to be advantageous that the transmitter is connected to the rotatable element via a coupling. By means of a coupling, the transmitter, in particular the transmitter shaft, can be connected to an element, such as, for example, a shaft, for example of a motor or a generator, in a simple way.

In this context, it has proven to be advantageous that the coupling is in the form of an Oldham coupling since an Oldham coupling is easy to fit.

Furthermore, it has proven to be advantageous that the housing has a housing edge, the connection between the housing and the basic body being realized via a screw connection, a screw head pressing an outer edge region of the housing edge in the direction of the basic body. This makes particularly simple fitting of the basic body possible.

Furthermore, it has proven to be advantageous that the housing has a housing edge, the connection between the housing and the basic body being realized via a screw connection, the housing edge having a slot. This likewise makes simple fitting of the housing possible.

Furthermore, it has proven to be advantageous to form a machine tool, production machine and/or robot with the measuring device according to the invention.

In addition, it has proven to be advantageous to form a generator or a motor with the measuring device according to the invention.

Advantageous designs of the measuring device similarly result in advantageous embodiments of the method, and vice versa.

BRIEF DESCRIPTION OF THE DRAWING

Exemplary embodiments of the invention will be illustrated in the drawing and explained in more detail in the text which follows. In the drawing.

DETAILED DESCRIPTION OF PREFERRED EMBODIMENTS

Figure 1:
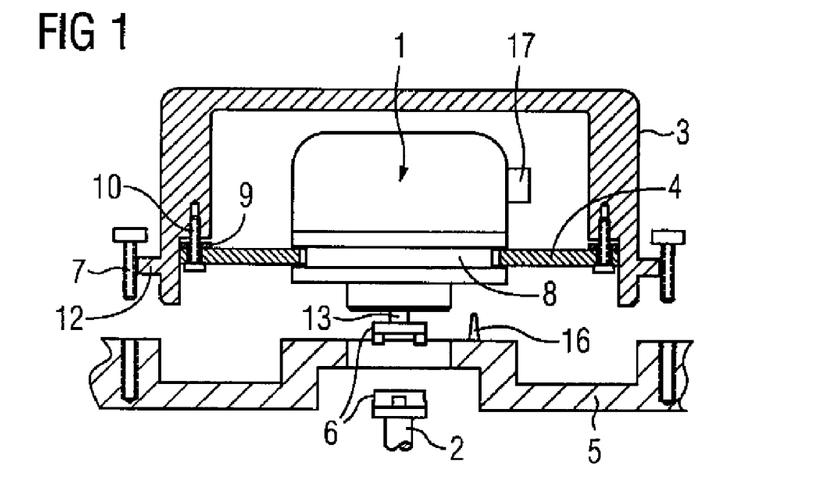
FIG. 1 shows an embodiment of a measuring device according to the invention prior to the connection to the basic body.

FIG. 1 illustrates an embodiment of the measuring device according to the invention in a state prior to the connection to a basic body 5, which may be, for example, in the form of an end frame of a mount of a motor. The measuring device has a transmitter 1 for measuring a position and/or a rotation speed of a rotatable element, which, in the exemplary embodiment, is in the form of a shaft, in particular a motor shaft 2, as well as a housing 3, which, in the exemplary embodiment, is in the form of a motor cover. Furthermore, the measuring device has a plate 4 with a cutout for accommodating the transmitter 1, the transmitter 1 being arranged such that it can rotate with respect to the plate 4. The transmitter 1 is arranged such that it can rotate in the cutout of the plate 4 and, in the exemplary embodiment, has an annular groove 8, the plate 4 engaging in the annular groove 8. The transmitter 1 is in this case inserted into the plate 4 in such a way that it can move freely in all directions within a certain range. In order to ensure this, the cutout in the plate 4 is slightly larger than the diameter of the annular groove 8 of the transmitter 1. Furthermore, the width of the annular groove 8 is slightly larger than the thickness of the plate 4, with the result that the transmitter is capable of moving, likewise to a small extent, with respect to the plate in the axial direction of the motor shaft 2. Furthermore, the plate 4 is arranged such that it is capable of moving freely in the direction of the axis of the motor shaft 2 in relation to the housing 3 in the axial direction. This is ensured by the plate 4 being connected to the housing 3 via spacers, which may be present, for example, in the form of screws and/or press pins.

In the exemplary embodiment, a spring element 9 is arranged between the plate 4 and the housing 3, which spring element 9 may be in the form of a helical spring, an O ring and/or a rubber sleeve, for example. The connection between a transmitter shaft 13 and the motor shaft 2 of a motor is produced with the aid of a coupling 6, which may be present, for example, in the form of an Oldham coupling. The transmitter 1 and a basic body 5, which, in the exemplary embodiment, is in the form of an end frame of the motor, have an interlocking mechanical coding, which defines the angular position of the transmitter in relation to the basic body and/or, depending on the design, possibly additionally arranges the transmitter centrally on the basic body.

In the exemplary embodiment, the mechanical coding comprises a pin 16, which engages in a corresponding depression of the transmitter 1, which depression is not illustrated in FIG. 1. When the measuring device is positioned on the basic body 5, the transmitter is guided through the predetermined interlocking connection of the mechanical coding in such a way that the angular position between the transmitter and the basic body is defined, i.e. fixed. The transmitter 1 is in this case guided by means of a centering ring 14 (see FIG. 9) in such a way that it is arranged centrally on the basic body 5. The coupling between the transmitter shaft 13 and the motor shaft 2 is realized when the measuring device is positioned on the basic body 5, by the pluggable construction of the coupling 6, in particular its interlocking connection. Furthermore, the transmitter 1 also has a transmitter connection 17, the transmitter 1 making available its input and output signals at the transmitter connection 17. As long as the housing 3 is not connected to the basic body 5, for example by means of a screw connection 7, i.e. the screws 7 have not been tightened, the housing 3 can rotate as desired together with the interface connection 11 (illustrated in FIG. 5 and FIG. 6) of the housing 3, without in the process the angular position of the transmitter 1 in relation to the basic body 5 being changed. The interface connection 11 of the measuring device can therefore be positioned as desired. The transmitter connection 17 is in this case connected to the interface connection 11 via corresponding cables. The interface connection 11 can now be aligned as desired, for example in the direction of a control assembly which requires the signal of the transmitter, by means of a rotary movement of the housing 3.

If the housing 3 is now connected to the basic body 5 by the screws 7 being tightened, then the plate 4 is pressed in the direction of the basic body 5 by the housing 3, as a result of which in this way the transmitter is pressed against the basic body 5 and the housing 3 is pressed against the plate 4. Owing to the pressing operation, the position of the housing 3 and the transmitter 1 is fixed. Both the housing 3 and the transmitter 1 are then no longer capable of rotating or capable of moving in the axial direction of the motor shaft 2.

Figure 2:
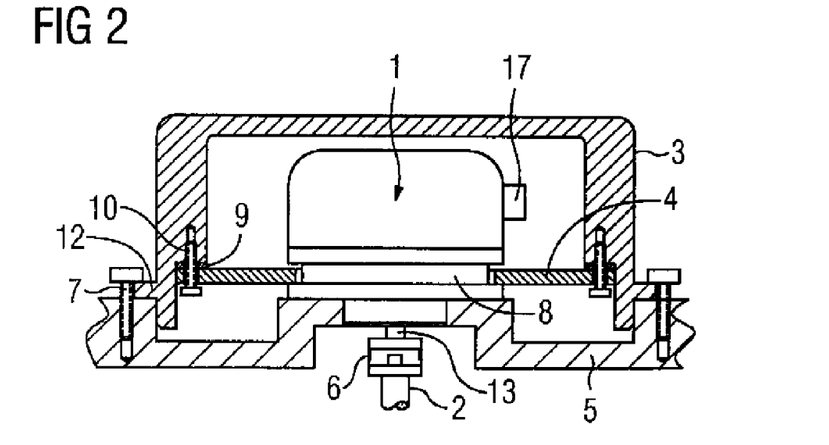
FIG. 2 shows an embodiment of a measuring device according to the invention after the connection to the basic body.

FIG. 2 illustrates the measuring device according to the invention after the housing 3 has been connected to the basic body 5. The designation of the elements corresponds to those in FIG. 1. In order that the pressing does not result in any damage to the transmitter 1 and/or the housing 3, a spring element 9 is arranged between the housing 3 and the plate 4 for compensation purposes. If it is desired, for example, to once again change the position of the interface connection 11 once the measuring device has been installed, it is only necessary to loosen the screws 7 slightly, and then to rotate the housing 3 with the plate 4 in relation to the transmitter 1, which as before is fixed in its angular position by means of the mechanical coding, and after the positioning to tighten the screws 7 again, as a result of which the transmitter and the housing are again fixed in the axial direction of the motor shaft.

Figure 3:
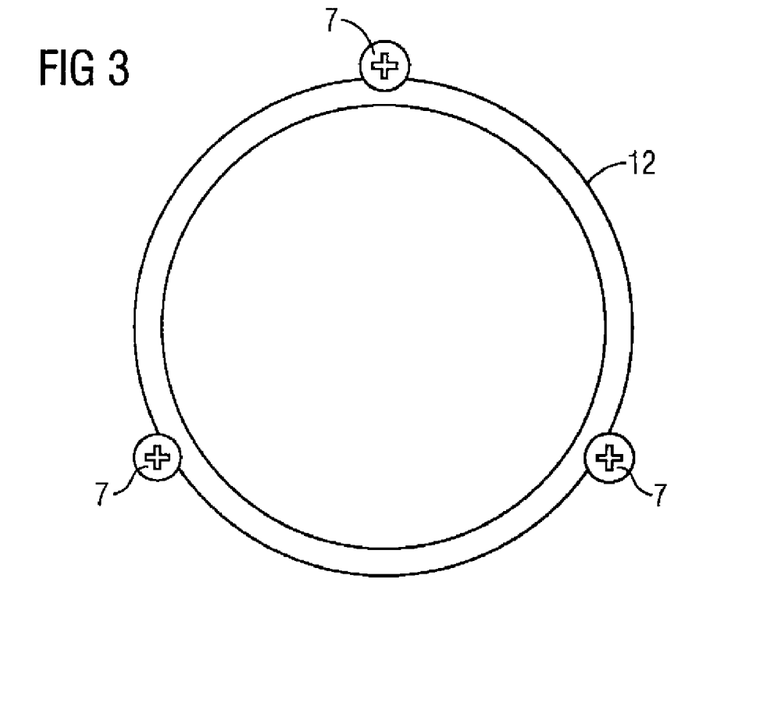
FIG. 3 shows a design of a housing edge of the housing.

In the exemplary embodiment, the housing 3 has a housing edge 12, which is illustrated in FIG. 1, FIG. 2 and FIG. 3. FIG. 3 once again shows the arrangement of the screws 7 in relation to the housing edge 12. The connection of the housing 3 to the basic body 5 can be realized via a screw connection 7, the screw heads pressing an outer edge region of the housing edge 12 in the direction of the basic body 5.

Figure 4:
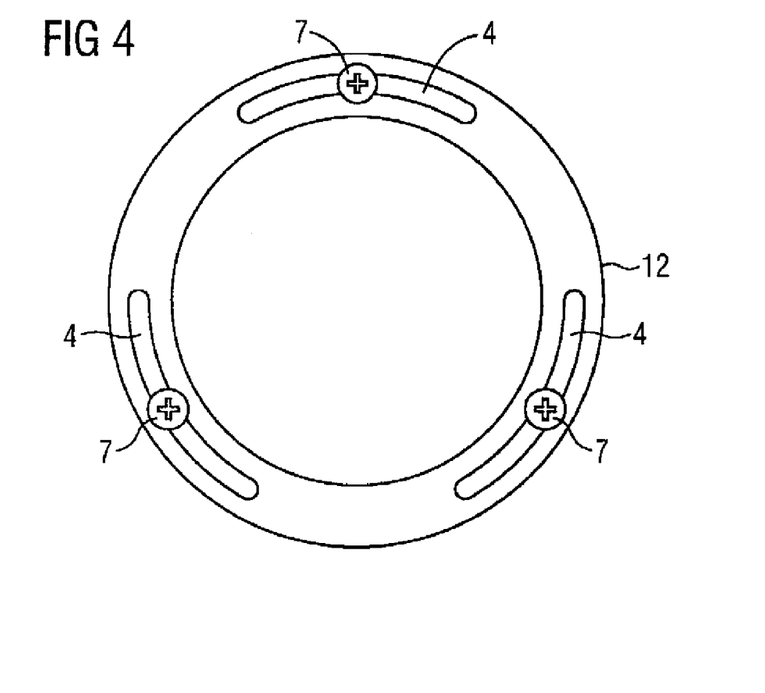
FIG. 4 shows a further design of the housing edge of the housing.

As an alternative to this, however, the connection between the housing 3 and the basic body 5 can also be realized via a screw connection 7 as illustrated in FIG. 4, the housing edge 12 having a slot 4.

Figure 5:
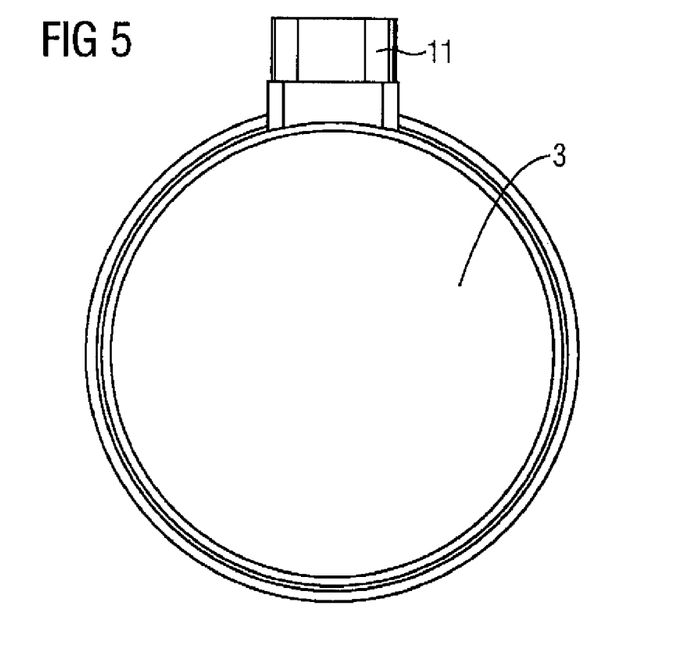
FIG. 5 shows a rear view of the measuring device.

FIG. 5 illustrates, in the form of a rear view, the measuring device with the housing 3 and the interface connection 11.

Figure 6:
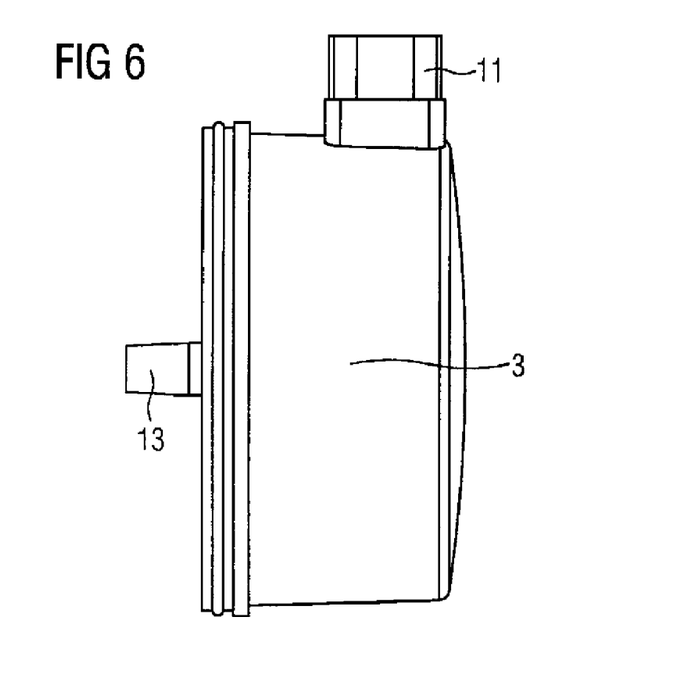
FIG. 6 shows a side view of the measuring device.

FIG. 6 illustrates a side view of the measuring device with the housing 3, the interface connection 11 and the motor shaft 13.

Figure 7:
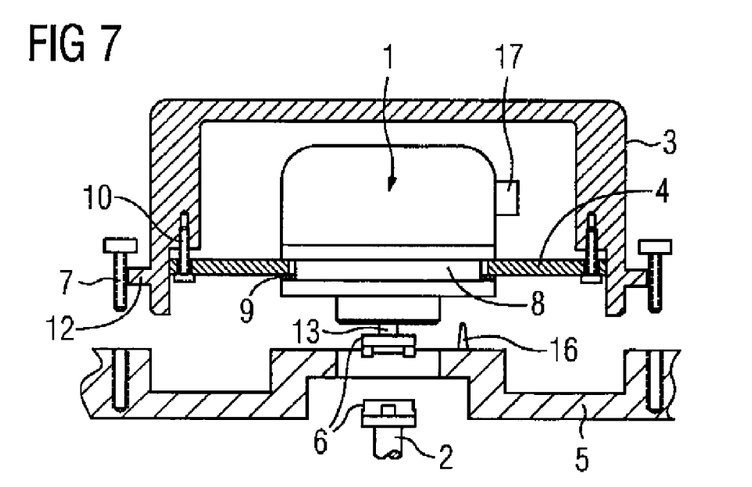
FIG. 7 shows a further embodiment of the measuring device according to the invention prior to the connection to the basic body.
Figure 8:
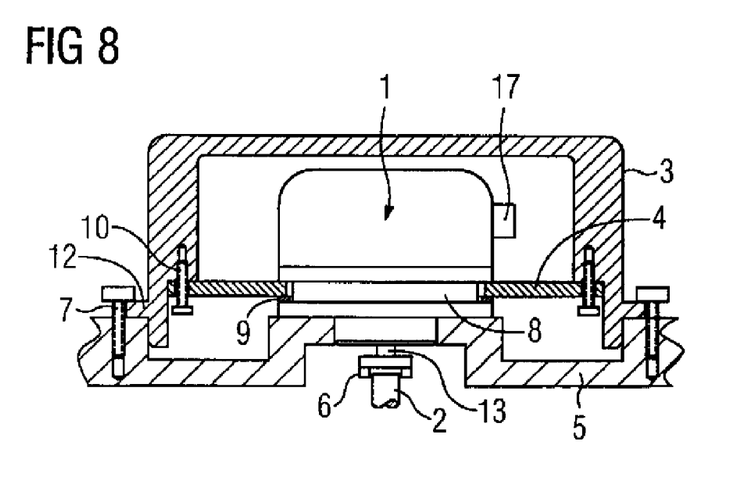
FIG. 8 shows a further embodiment of the measuring device according to the invention after the connection to the basic body.

The embodiment illustrated in FIG. 7 and FIG. 8 corresponds in terms of its basic design substantially to the embodiment described above in FIG. 1 and FIG. 2. Identical elements have therefore been provided with the same reference symbols in FIG. 7 and FIG. 8 as in FIG. 1 and FIG. 2. The only substantial difference consists in the fact that, in the embodiment shown in FIG. 7 and FIG. 8, the plate 4 is connected to the transmitter 1 via a spring element 9 such that it can rotate. Precisely as in the embodiment shown in FIG. 1 and FIG. 2, in this arrangement of the spring element 9 as well it is possible to avoid damage to the transmitter 1 and/or the housing 3 during the pressing. However, it is naturally also possible to combine both embodiments with one another and to provide an additional spring element, which is arranged as shown in the exemplary embodiment shown in FIG. 7 and FIG. 8, in addition to the spring element, which is arranged as shown in the exemplary embodiment shown in FIG. 1 and FIG. 2.

Figure 9:
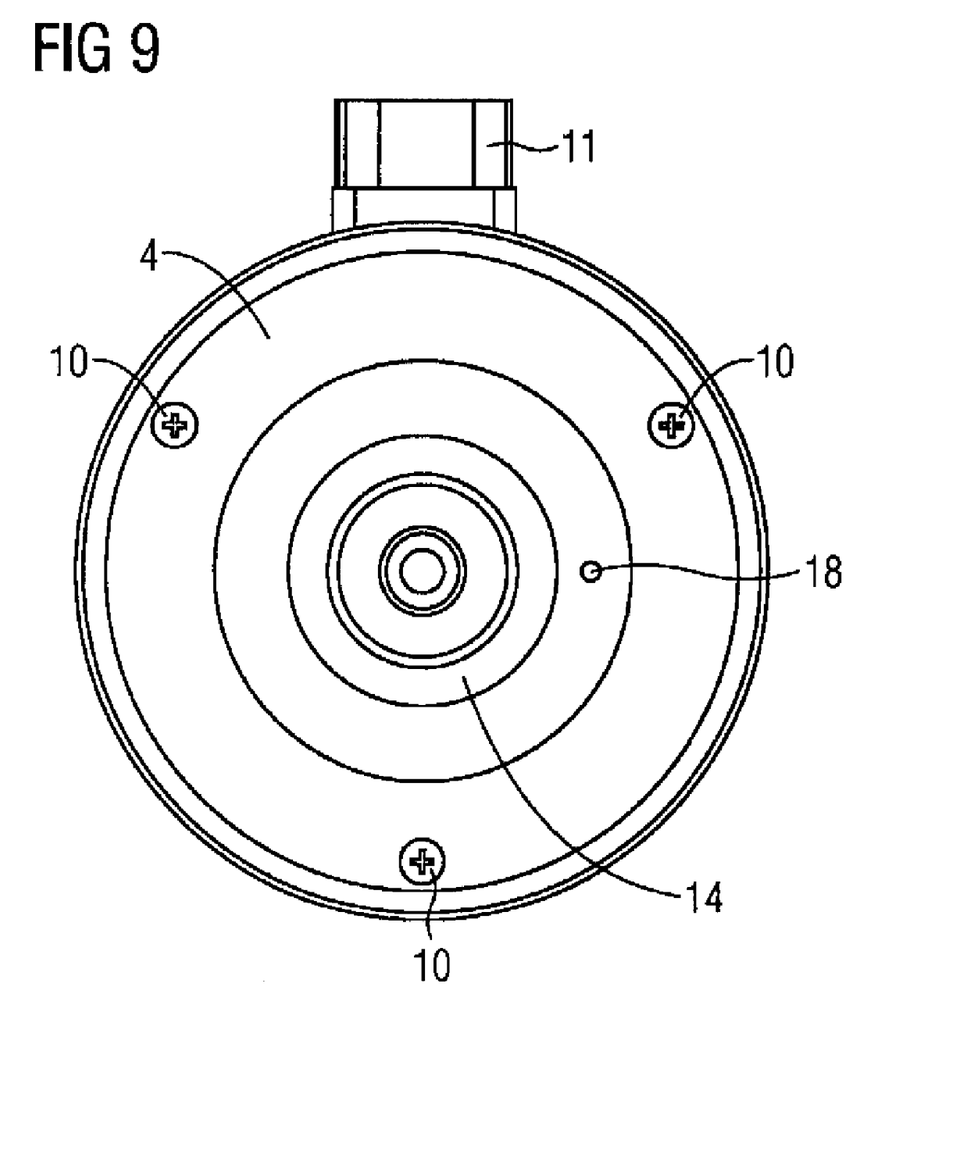
FIG. 9 shows a front view of an embodiment of the measuring device according to the invention.

FIG. 9 shows a front view of the measuring device with the interface connection 11, the plate 4, the spacers 10, a centering ring 14 and a depression 18 for accommodating the pin 16 as shown in FIG. 1 and FIG. 2.

Figure 10:
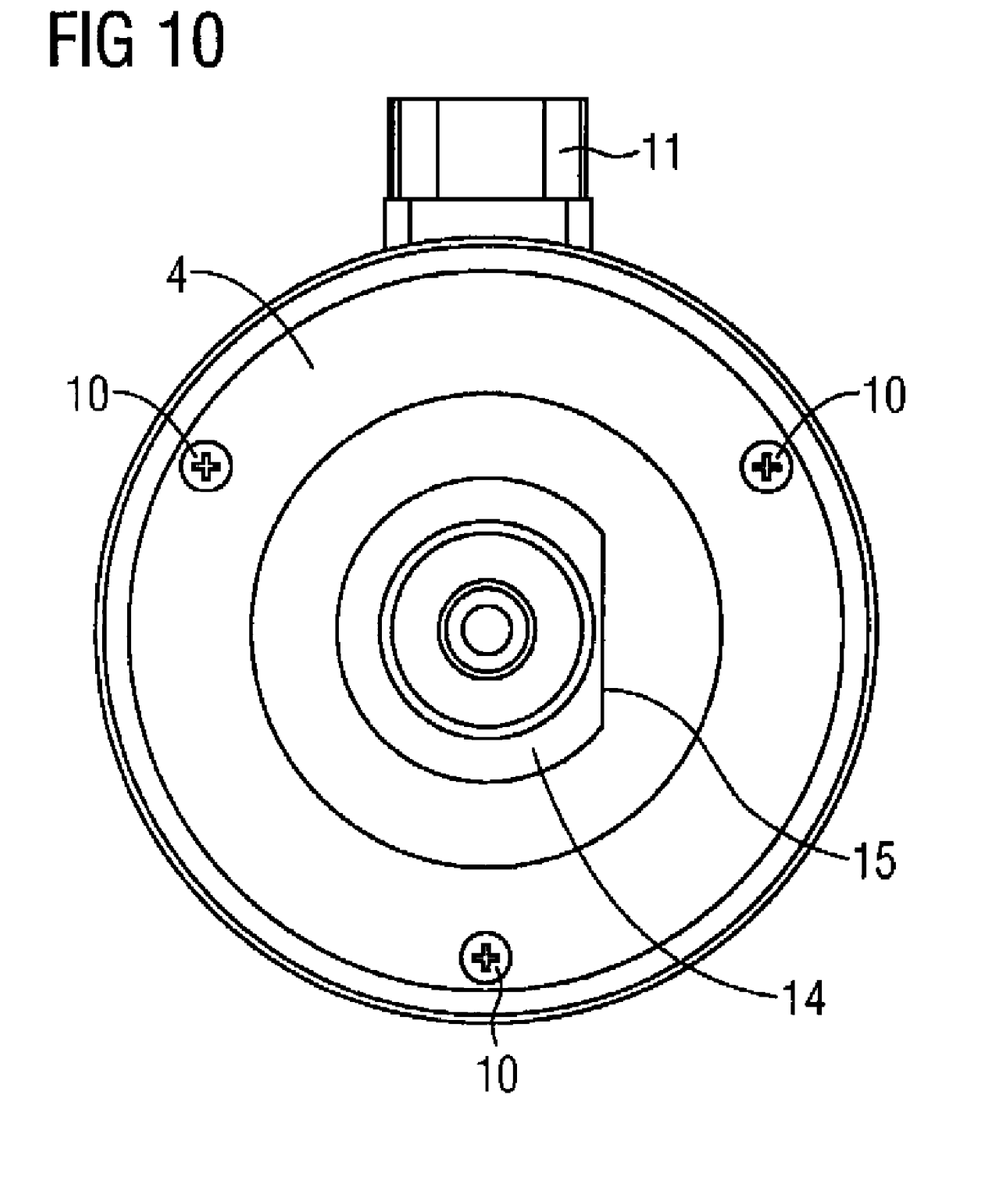
FIG. 10 shows a further front view of an embodiment of the measuring device according to the invention.

FIG. 10 illustrates, in the form of a front view, a further embodiment of the measuring device, identical elements having been provided with the same reference symbols as in FIG. 9. The substantial difference between the embodiment shown in FIG. 10 and the embodiment shown in FIG. 9 consists in the fact that the mechanical coding is not realized as in FIG. 10 in the form of a pin with a depression 18, but that in FIG. 9 the centering ring 14 not only serves the purpose of centering the transmitter with the basic body but also the centering ring 14 of the transmitter 1 has a flattened portion 15, which engages in a corresponding recess arranged on the basic body 5 in an interlocking manner. In this way, a single element, namely the centering ring 14, can be used to implement both centering of the transmitter and a mechanical coding of the angular position of the transmitter in relation to the basic body.

Naturally, not only can the rotatable element 2 be in the form of a shaft, which may be, for example, in the form of a shaft of a motor or a generator, but it can also be in the form of a spindle, for example of a machine tool, production machine or a robot. Furthermore, the basic body also does not necessarily need to be an end frame, for example of a motor or a generator.

What is claimed is:

1. A measuring device, comprising:
   a transmitter for measuring a position and/or a rotation speed of a rotatable element;
   a housing; and
   a plate having a cutout for accommodating the transmitter, said transmitter being arranged so as to be able to rotate with respect to the plate,
   wherein the transmitter, the plate, and the housing are arranged in such a way that, when the housing is connected to a basic body, the housing presses the plate in a direction of the basic body so that the transmitter is pressed against the basic body and the housing is pressed against the plate,
   wherein the transmitter and the basic body have an interlocking mechanical coding to define an angular position of the transmitter in relation to the basic body.

2. The measuring device of claim 1, further comprising at least one member selected from the group consisting of a spring element and spacer for connecting the plate to the housing.

3. The measuring device of claim 1, further comprising a spring element for connecting the plate to the transmitter in such a way that the plate is able to rotate in relation to the transmitter.

4. The measuring device of claim 2, wherein the spring element is constructed in the form of a helical spring, an O ring and/or a rubber sleeve.

5. The measuring device of claim 3, wherein the spring element is constructed in the form of a helical spring, an O ring and/or a rubber sleeve.

6. The measuring device of claim 2, wherein the spacer is constructed in the form of a screw and/or a press pin.

7. The measuring device of claim 1, wherein the rotatable element is a shaft and/or a spindle.

8. The measuring device of claim 7, wherein the shaft is a motor shaft or a generator shaft.

9. The measuring device of claim 1, wherein the basic body is constructed in the form of an end frame.

10. The measuring device of claim 1, wherein the transmitter has an annular groove for engagement of the plate.

11. The measuring device of claim 1, wherein the coding is implemented in the form of a pin and a depression which corresponds to the pin.

12. The measuring device of claim 1, further comprising a centering ring having a flattened portion to define a component of the coding, said basic body having a recess defining another component of the coding and shaped to complement the flattened portion.

13. The measuring device of claim 1, further comprising a coupling for connecting the transmitter to the rotatable element.

14. The measuring device of claim 13, wherein the coupling is an Oldham coupling.

15. The measuring device of claim 1, wherein the housing has a housing edge, and further comprising a screw connection for connecting the housing with the basic body, with a screw head of the screw connection pressing an outer edge region of the housing edge in the direction of the basic body.

16. The measuring device of claim 1, wherein the housing has a housing edge, and further comprising a screw connection for connecting the housing with the basic body, with the housing edge having a slot.

17. A machine tool, production machine and/or robot having a measuring device which includes a transmitter for measuring a position and/or a rotation speed of a rotatable element, a housing, and a plate having a cutout for accommodating the transmitter, said transmitter being arranged so as to be able to rotate with respect to the plate, wherein the transmitter, the plate, and the housing are arranged in such a way that, when the housing is connected to a basic body, the housing presses the plate in a direction of the basic body so that the transmitter is pressed against the basic body and the housing is pressed against the plate, and wherein the transmitter and the basic body have an interlocking mechanical coding to define an angular position of the transmitter in relation to the basic body.

18. A motor or generator having a measuring device which includes a transmitter for measuring a position and/or a rotation speed of a rotatable element, a housing, and a plate having a cutout for accommodating the transmitter, said transmitter being arranged so as to be able to rotate with respect to the plate, wherein the transmitter, the plate, and the housing are arranged in such a way that, when the housing is connected to a basic body, the housing presses the plate in a direction of the basic body so that the transmitter is pressed against the basic body and the housing is pressed against the plate, and wherein the transmitter and the basic body have an interlocking mechanical coding to define an angular position of the transmitter in relation to the basic body.

* * * * *